United States Patent Office 3,420,553
Patented Jan. 7, 1969

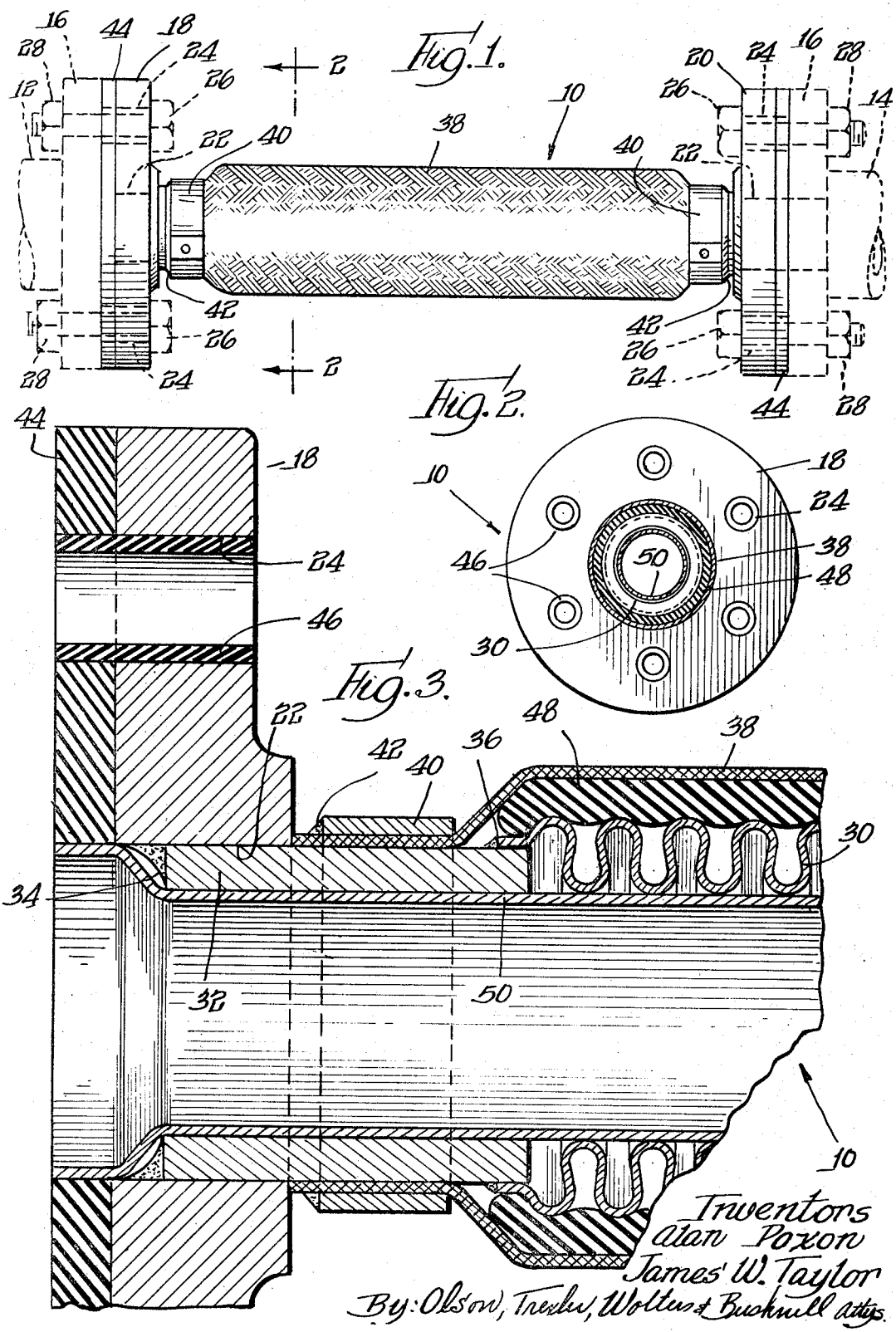

3,420,553
APPARATUS FOR ABSORBING SOUND AND VIBRATION IN A PIPING SYSTEM
Alan Poxon, Oakville, Ontario, and James W. Taylor, Inglewood, Ontario, Canada, assignors to Calumet & Hecla, Inc., Chicago, Ill., a corporation of Michigan
Filed Feb. 9, 1966, Ser. No. 526,265
U.S. Cl. 285—49        3 Claims
Int. Cl. F16l 51/02

ABSTRACT OF THE DISCLOSURE

The structure herein disclosed comprises the composite expansion joint and vibration absorbing unit, for pipelines, the joint including an inner liner, a section of annularly corrugated flexible metal tubing encompassing the liner, a sleeve of soft resilient material encompassing the corrugated tubing, and an outer encompassing metal braid sheath; whereby to provide a fluid-tight unit which will absorb sound and vibration.

---

This invention relates generally to apparatus for absorbing sound and vibration and especially to means for eliminating, modifying or isolating the transmission of sound and vibration in piping and ducting systems.

In the past, tubular connectors fabricated from rubber have been commonly used to isolate sound and vibration in fluid-conducting systems. However, these rubber connectors are restricted to use with fluids of comparatively low temperature and under comparatively low pressure. Corrugated metal tubing, on the other hand, is capable of handling fluids of considerably higher pressure and temperature and, in addition, possesses the ability to damp the transmission of vibration and other low frequency mechanical energy. However, such tubing has little or no sound absorbing properties.

Therefore, an important object of the present invention is to provide a tubular connector which isolates both sound and vibration and which has substantial latitude in its tolerance for the pressure and temperature of the transmitted fluid.

A more general object of the invention is to provide new and improved apparatus for absorbing sound and vibration in a piping system or the like.

Another object of the invention is to provide a sound and vibration absorbing connector that is easy to manufacture and convenient to use.

These and other objects and features of the invention will become more apparent from a consideration of the following descriptions.

Apparatus in accord with the invention includes a pair of spaced end flanges of rigid material and a tube of corrugated metal fastened between the end flanges. The flexibility of the corrugated tube prevents the transmission of vibrational energy from one end flange to the other; and in order to prevent sound transmission through the unit, a pad of soft, resilient material is secured to the outer surface of each end flange and a sheath of soft, resilient material is disposed over the surface of the corrugated tube.

The invention, both to its construction and its mode of operation, will be better understood by reference to the following disclosure and drawing forming a part thereof, wherein:

FIG. 1 is an elevational view of a sound and vibration absorbing connector shown coupled in a piping;

FIG. 2 is an end elevational view taken substantially through the section 2—2 of FIG. 1; and FIG. 3 is an enlarged sectional view through one end of the connector of FIG. 1 showing the details of its construction.

Referring now in detail to the drawing, specifically to FIG. 1, a sound and vibration absorbing connector indicated generally by the numeral 10 is shown in a piping system between a conduit 12 and a conduit 14. Each of the conduits 12 and 14 is provided with an annular mounting flange 16 having an appropriate array of bolt holes.

In compliance with the features of the present invention, the connector 10 comprises a pair of axially spaced end flanges 18 and 20. Each of these end flanges is fashioned with a central, fluid-passing aperture 22 and a suitable number of fastener-passing apertures 24. The central apertures 22 are generally aligned with the central channels in the conduits 12 and 14, and the apertures 24 are provided in number and arrangement corresponding to the bolt holes in the flanges 16. Thus, the connector 10 may be mounted in the piping system by means of bolts 26 and cooperating nuts 28.

With reference to FIG. 3, the connector 10, in addition to the end flanges 18 and 20, comprises a tube 30 of corrugated metal which is mounted between the end flanges coaxially with the central apertures thereof. In compliance with the invention, the means for securing the tube 30 to each of the end flanges includes a rigid collar 32 that is partially telescopingly received in the central aperture 22 of the end flange to be held in place by means of an annular weldment 34. An open end of the corrugated metal tube 30 is slipped over the collar 32 to be secured in place by an annular weldment 36. As protection for the tube 30, a sleeve 38 of braided metal strands is disposed over the tube 30 to be fastened to the respective collars 32, a rigid metal collar 40 being advantageously fastened to the braided sleeve 38 by an annular weldment 42 for purposes of attachment of the braided sleeve.

In compliance with the features of the present invention, a pad 44 of soft, resilient material is affixed to the outer surface of each end flange, as for example by means of suitable adhesive; and a sleeve 46 of soft, resilient material is situated in each of the fastener-passing apertures 24. Furthermore, a sheath 48 of soft, resilient material is located between the braided sleeve 38 and the corrugated tube 30. The pad 44, the sleeves 46 and the sheath 48 act to damp sound waves and other vibrations that are impressed on either the end flange 18 or the end flange 20 thus preventing transmission of such types of energy through the piping system. Moreover, the flexibility of the corrugated tube 30 coacts with the resiliency of the sheath 48 to further the vibration isolating characteristics of the connector 10. In addition, the pad 44, the sleeves 46 and the sheath 48 may be fabricated from a number of suitable materials; and synthetic rubber, for example, of a suitable durometer for the particular application may usefully be employed.

In those cases in which the connector 10 is to carry a corrosive fluid, an inert liner 50 is provided on the interior of the connector extending from the end flange 18 to the end flange 20. Attachment of the liner 50 may be achieved by means of a suitable adhesive joint at each of the pads 44. The specific material from which the liner 50 is to be fabricated will be selected in compliance with the nature of the fluid to be passed through the connector.

From the foregoing descriptions, it will be apparent that the present invention presents apparatus for effectively absorbing and preventing the transmission of sound and vibrational energy in a piping system. It will also be apparent that the apparatus of the invention is strong and capable of withstanding a substantial variety of operating conditions including appreciable ranges of temperature and internal pressure as well as the passage of corrosive fluids. Moreover, the apparatus of the invention eliminates hazards from fire and minimizes impairment of the function of the connector through accidental damage as by external blows.

Therefore, the specific example herein shown and described should be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. Apparatus for absorbing sound and vibration in a piping system, comprising: a pair of spaced end flanges of rigid material; a pad of soft, resilient material secured to the outer surface of each of said end flanges; a tube of corrugated metal between said end flanges; means for securing said tube to said flanges, including a pair of rigid collars partially telescopingly received in the central apertures of said end flanges and further including mounting means securing said tube to each of said collars; a sleeve of braided strands fastened to said collars and disposed over said tube; and a sheath of soft, resilient material between said braided sleeve and said tube.

2. Apparatus for absorbing sound and vibration in a piping system, comprising: a pair of spaced end flanges of rigid material, each having a central, fluid-passing aperture and a plurality of fastener-passing apertures radially outwardly of said central aperture; a pad of soft, resilient material secured to the outer surface of each of said end flanges; sleeves of soft, resilient material in said fastener-passing apertures; a tube of corrugated metal between said end flanges coaxial with the central apertures thereof; means for securing said tube to said flanges, including a pair of rigid collars partially telescopingly received in the central apertures of said end flanges and further including mounting means securing said tube to each of said collars; a sleeve of braided strands fastened to said collars and disposed over said tube; and a sheath of soft, resilient material between said braided sleeve and said tube.

3. Apparatus for absorbing sound and vibration in a piping system, comprising: a pair of spaced end flanges of rigid material, each having a central, fluid-passing aperture and a plurality of fastener-passing apertures radially outwardly of said central aperture; a pad of soft, resilient material secured to the outer surface of each of said end flanges; sleeves of soft, resilient material in said fastener-passing apertures; a tube of corrugated metal between said end flanges coaxial with the central apertures thereof; means for securing said tube to said flanges, including a pair of rigid collars partially telescopingly received in the central apertures of said end flanges and further including mounting means securing said tube to each of said collars; a sleeve of braided metal strands fastened to said collars and disposed over said tube; and a sheath of soft, resilient material between said braided sleeve and said tube.

References Cited

UNITED STATES PATENTS

| 34,455 | 2/1862 | Wilcox | 285—48 XR |
| 2,444,988 | 7/1948 | Guarnaschelli | 138—122 XR |
| 2,449,369 | 9/1948 | Doane et al. | 138—121 |
| 2,565,184 | 8/1951 | Parlasca | 181—36.2 |
| 2,757,690 | 8/1956 | Young | 138—121 XR |
| 3,135,296 | 6/1964 | Kelstrom et al. | 138—122 |
| 3,273,596 | 9/1966 | Beckett | 181—47.1 |

FOREIGN PATENTS

| 681,362 | 3/1964 | Canada. |
| 1,075,364 | 4/1954 | France. |
| 885,032 | 7/1953 | Germany. |
| 769,993 | 3/1957 | Great Britain. |

ROBERT S. WARD, JR., *Primary Examiner.*

U.S. Cl. X.R.

285—363; 181—36; 138—121, 139; 285—50